L. L. LAMB.
Tool-Holders.
No. 135,715. Patented Feb. 11, 1873.
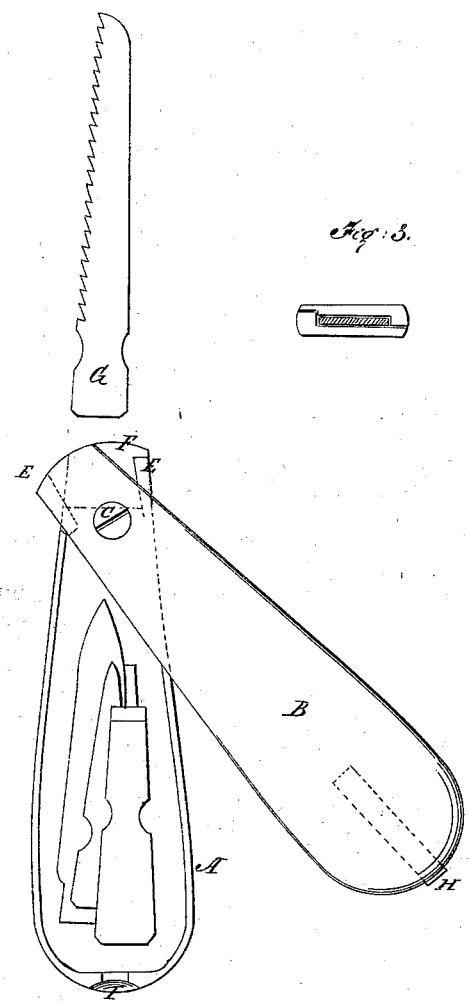
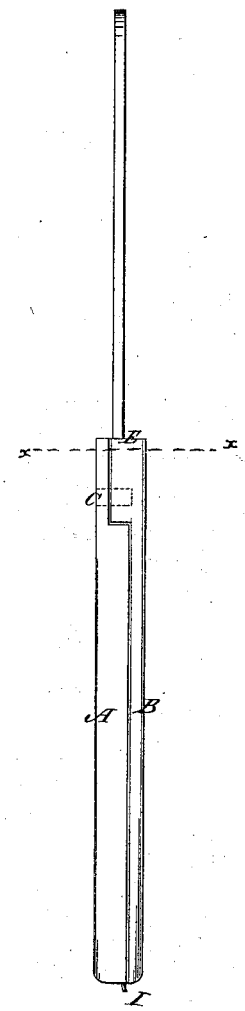

UNITED STATES PATENT OFFICE.

LEVI L. LAMB, OF CHELSEA, MASSACHUSETTS.

IMPROVEMENT IN TOOL-HOLDERS.

Specification forming part of Letters Patent No. 135,715, dated February 11, 1873.

*To all whom it may concern:*

Be it known that I, LEVI LYSANDER LAMB, of Chelsea, in the county of Suffolk and State of Massachusetts, have invented a new and useful Improvement in Tool-Holders, of which the following is a specification:

My invention consists of a box-handle for containing the tools and holding them for use, comprising a box and cover, which are pivoted together near the end for holding the tools for use, so as to open by swinging the cover in the plane of the top of the box and close it by a reverse movement, and the box and cover have each a jaw, between which the dovetail-shaped heads of the tools will be secured, to be held for use when the box-handle is closed, and opened to release the tools when the handle is opened, so that, by the same operation by which the tool in use is released to be taken out, the box is opened to receive the tool to be changed, and allow of taking out another, thus economizing labor and time; besides, the construction is simpler and cheaper than any other. A spring-catch is used to fasten the box closed.

Figure 1 is a plan view of my improved combination tool-holder with the cover turned on its pivot to open the jaws and the box. Fig. 2 is a side elevation taken in a plane perpendicular to that of Fig. 1, and Fig. 3 is a cross-section of Fig. 2 on the line *x x*.

Similar letters of reference indicate corresponding parts.

A is the box, and B the cover, comprising the handle. They are pivoted together at C, so as to open and close for putting the tools in and taking them out of the box by swinging in the plane of the top of the box, and they are each provided with a jaw or lip, E, beyond the pivot, and so formed that when closed a dovetail-shaped socket, F, is had in the end adapted to secure the tools by the correspondingly-shaped shank G formed on each. H is the spring-catch on the handle for fastening the two parts together when closed by dropping into a notch, I.

This contrivance is very simple and cheap to make, and it is more desirable than others of its kind, because the operation for releasing the tool to be changed also opens the box to allow of putting in the tool and taking out another, and the operation for securing the tool for use closes the box, thus lessening the labor by about half, compared with the other instruments of this character.

I am aware that pocket-knives have been constructed with dovetail sockets, and therefore do not desire to claim this feature, broadly.

Having thus described my invention, I claim as new and desire to secure by Letters Patent—

The box A and laterally-swinging cover B, each provided with a lip, E, so as to form, when closed, the dovetailed socket F, as described, for the purpose set forth.

LEVI LYSANDER LAMB.

Witnesses:
JOHN ASHMAN,
SEWELL K. LOVEWELL.